(12) United States Patent
Kim et al.

(10) Patent No.: US 12,485,156 B2
(45) Date of Patent: Dec. 2, 2025

(54) COMPOSITION FOR PREVENTING OR TREATING SLEEP DISORDERS, CONTAINING ENZYME-TREATED ASHWAGANDHA EXTRACT AS ACTIVE INGREDIENT

(71) Applicant: N biotech Co., Ltd., Hwaseong-si (KR)

(72) Inventors: Deok Su Kim, Yongin-si (KR); Su Young Bae, Hwaseong-si (KR); Chang Hyeon Park, Osan-si (KR); Ye Jin Ahn, Seoul (KR); Chun Woong Park, Seoul (KR)

(73) Assignee: N biotech Co., Ltd., Hwaseong-si (KR)

( * ) Notice: Subject to any disclaimer, the term of this patent is extended or adjusted under 35 U.S.C. 154(b) by 0 days.

(21) Appl. No.: 18/205,436

(22) Filed: Jun. 2, 2023

(65) Prior Publication Data
US 2023/0355702 A1 Nov. 9, 2023

Related U.S. Application Data

(63) Continuation of application No. 18/070,078, filed on Nov. 28, 2022, now abandoned.

(30) Foreign Application Priority Data

Jan. 11, 2022 (KR) ........................ 10-2022-0004036

(51) Int. Cl.
A61K 36/81 (2006.01)
A61P 25/20 (2006.01)

(52) U.S. Cl.
CPC .............. *A61K 36/81* (2013.01); *A61P 25/20* (2018.01); *A61K 2236/19* (2013.01); *A61K 2236/331* (2013.01); *A61K 2236/37* (2013.01)

(58) Field of Classification Search
None
See application file for complete search history.

(56) References Cited

FOREIGN PATENT DOCUMENTS

| | | | |
|---|---|---|---|
| KR | 10-2020-0065713 A | 6/2020 | |
| KR | 10-2020-0114301 A | 10/2020 | |

OTHER PUBLICATIONS

Kataria et al., Water Extract of Ashwagandha Leaves Limits Proliferation and Migration, and Induces Differentiation in Glioma Cells, 2011, Evidence Based Complementary and Alternative Medicine, 2011: ID 267614, pp. 1-12 (Year: 2011).*
Hossain et al., Antioxidative and anti-α-amylase activities of four wild plants consumed by pastoral nomads in Egypt, 2009, Oriental Pharmacy and Experimental Medicine, 9: 217-224 (Year: 2009).*
Monteiro de Sousa et al. Application of Microbial Alpha-AMYLASE In Industry—A Review, 2010, Brazilian Journal of Microbiology, 41: 850-861 (Year: 2010).*
Farias et al., Microbial amylolytic enzymes in foods: Technological importance of the *Bacillus genus*, 2021, Biocatalysis and Agricultural Biotechnology, 35: 102054, pp. 1-12.*
Korean Request for the Submission of an Opinion for 10-2022-0004036, dated Feb. 8, 2022.
Kae Ling Cheah et al., "Effect of Ashwagandha (Withania somnifera) extract on sleep: A systematic review and meta-analysis", PLOS ONE, Sep. 24, 2021, pp. 1-22.
Korean Written Opinion on Registration for 10-2022-0004036, dated Mar. 17, 2022.
Young-Chan Kim et al., "Antioxidant Activity of Ginseng Extracts Prepared by Enzyme and Heat Treatment", J Korean Soc Food Sci Nutr, 2007, pp. 1482-1485, 36(11).
Kaushik et al., Triethylene glycol, an active component of Ashwagandha (Withania somnifera) leaves, is responsible for sleep induction, 2017, PLoS ONE, 12: 1-12 (Year: 2017).
Pre-Grant Opposition dated Nov. 21, 2022, issued in Indian Patent Application No. 202224066822.
Vangasena Vangasena—Commentator Shaligram Vaisya, Edited Shankar lalji Jain; Khemraj Shrikrishna Das Prakashan, Bombay, Edn. 1996 p. 909 (1161 pages), Formulation ID: AK11/4074, Formulation Name: Asvagandhadi Yoga.

* cited by examiner

*Primary Examiner* — Terry A Mckelvey
*Assistant Examiner* — Catheryne Chen
(74) *Attorney, Agent, or Firm* — Sughrue Mion, PLLC

(57) ABSTRACT

The present invention relates to a composition for preventing sleep disorders or insomnia, containing an enzyme-treated Ashwagandha extract as an active ingredient, and specifically, since it was confirmed that in an animal model and a sleep disorder animal model, which were administered an enzyme-treated Ashwagandha extract, sleep latency and awake time during sleep were decreased, sleep time, non-rapid eye movement (NREM) sleep time and δ-waves were increased, and as a result, sleep activity was improved, the enzyme-treated Ashwagandha extract can be used as an active ingredient of a composition for preventing or treating sleep disorders or insomnia.

5 Claims, 4 Drawing Sheets

COMPOSITION FOR PREVENTING OR TREATING SLEEP DISORDERS, CONTAINING ENZYME-TREATED ASHWAGANDHA EXTRACT AS ACTIVE INGREDIENT

CROSS-REFERENCE TO RELATED APPLICATIONS

This application is a Rule 53 (b) Continuation of U.S. application Ser. No. 18/070,078 filed on Nov. 28, 2022, which claims priority to and the benefit of Korean Patent Application No. 10-2022-0004036, filed on Jan. 11, 2022, the disclosures of which are incorporated herein by reference in their entireties.

BACKGROUND

1. Field of the Invention

The present invention relates to a composition for preventing or treating sleep disorders, containing an enzyme-treated Ashwagandha extract as an active ingredient.

2. Discussion of Related Art

Not only the amount of sleep but also the quality of sleep play a big part in sleep deprivation. Sleeping pills or tranquilizers currently used as therapeutic agents for insomnia are mostly specialized pharmaceuticals and have side effects such as dependence and daytime sleepiness. Therefore, there is an increasing need for sleep-improving functional foods made from food materials rather than pharmaceuticals.

As the 'sleeponomics' market is growing rapidly, the Korea Sleep Association expects the domestic sleep economy size to reach 3 trillion won this year, and expects the global market size to exceed 60 trillion won. Reflecting this, sleep tech, which is useful for sleep, that is, technology that analyzes sleep conditions using artificial intelligence (AI), the Internet of Things (IoT), big data, and the like and helps one to sleep soundly, and related products such as beds and pillows, which reflect this, are being launched. Recently, sleep tech has expanded to the industrial field without being limited to the bedroom environment, so that the health functional food market that is useful for sleep is also growing. According to the data by the Ministry of Food and Drug Safety, raw materials approved as health functional food 'sleep health' raw materials from 2008 to 2018 include 'Ecklonia cava extract', 'rice bran spirit extract', and the like, and health functional foods that improve sleep quality using raw materials individually recognized by related companies are being released one after another.

Ashwagandha is a medicinal material typically used in Ayurveda, which is the traditional medicine of India, and is also known as Indian ginseng. Ashwagandha is an evergreen plant of the Solanaceae family that grows naturally in the arid regions of India, Nepal and the Middle East, and has the scientific name Withania somnifera. An Ashwagandha extract has also been studied with respect to various effects such as antioxidant, anxiety relief, memory enhancement, dementia relief, antiviral, anti-inflammatory, antitumor, immunomodulatory, antibacterial, cardiovascular protection and dependence.

Thus, the present inventors have made efforts to develop materials for improving and treating sleep disorders or insomnia derived from natural products which are safe for the human body, and as a result, found that an enzyme-treated Ashwagandha extract can be used as an active ingredient of a composition for preventing or treating sleep disorders or insomnia by confirming that the enzyme-treated Ashwagandha extract enhances sleep time and improves the quality of sleep in an animal model and a sleep disorder animal model, thereby leading to the present application.

RELATED ART DOCUMENTS

Patent Documents (Patent Document 1) Korean Patent Application Laid-Open No. 10-2020-0114301
(Patent Document 2) Korean Patent Application Laid-Open No. 10-2020-0065713

Non-Patent Documents (Non-Patent 1) BoMi Ryu and You-Jin Jeon, Development of functional food products with natural materials derived from marine resources, Food Science and Technology published on June (2018).

SUMMARY OF THE INVENTION

An object of the present invention is to provide a composition for preventing or treating sleep disorders or insomnia, containing an enzyme-treated Ashwagandha extract as an active ingredient.

To achieve the object of the present invention, the present invention provides a pharmaceutical composition for preventing or treating sleep disorders or insomnia, containing an enzyme-treated Ashwagandha extract as an active ingredient.

In addition, the present invention provides a health food composition for preventing or alleviating sleep disorders or insomnia, containing an enzyme-treated Ashwagandha extract as an active ingredient.

Furthermore, the present invention provides a food composition for preventing or alleviating sleep disorders or insomnia, containing an enzyme-treated Ashwagandha extract as an active ingredient.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
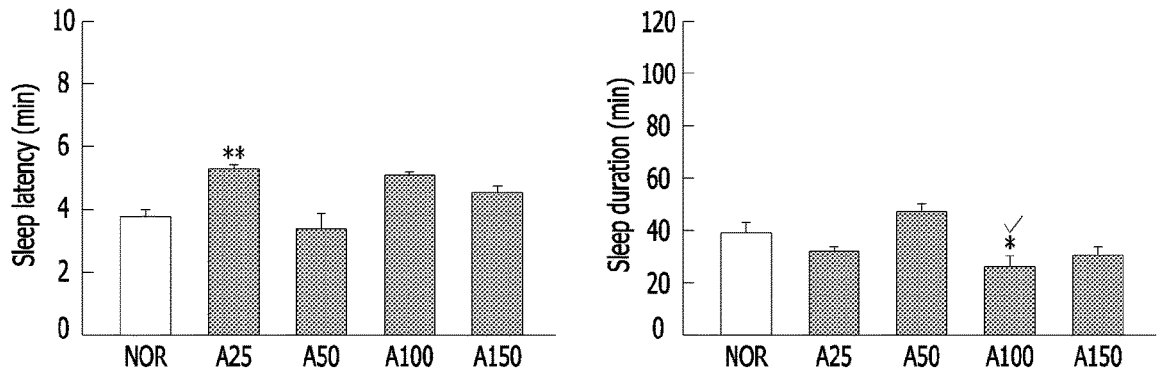
FIG. 1 is a view confirming changes in sleep latency and sleep duration by administration of 25, 50, 100 or 150 mg/kg of the Ashwagandha extract prepared in an exemplary embodiment of the present invention in animal models ($*p<0.05$, $**p<0.01$)

Hereinafter, the present invention will be described in more detail.

The present invention provides a pharmaceutical composition for preventing or treating sleep disorders or insomnia, containing an enzyme-treated Ashwagandha extract as an active ingredient.

The enzyme-treated Ashwagandha extract, which is the active ingredient of the present invention, is prepared by treating an Ashwagandha extract with an enzyme.

In the present invention, the Ashwagandha extract may be prepared by a method including, but not limited to, the following steps:

1) extracting Ashwagandha by adding an extraction solvent to Ashwagandha; and
2) filtering an extract of Step 1).

As for the Ashwagandha in Step 1), cultivated ones or commercially available ones may be used without limitation. Further, the flower, branch, stem, leaf, fruit, shoot, rhizome, or root parts of Ashwagandha may be used, and specifically, roots may be used, but are not limited thereto.

In addition, as the extraction solvent in Step 1), water, an alcohol or a mixture thereof may be used, and specifically, water may be used. A lower alcohol having 1 to 4 carbon atoms may be used as the alcohol, and ethanol or methanol may be used as the lower alcohol. As the extraction method, ultrasonic extraction, shaking extraction, Soxhelt extraction or reflux extraction may be used, but the extraction method is not limited thereto. Ashwagandha may be extracted by adding the extraction solvent in an amount which is 1-fold to 15-fold, more specifically, 2-fold to 10-fold the amount of Ashwagandha washed, thoroughly dried and pulverized. The extraction temperature may be 40 to 120° C., specifically 60 to 110° C., and more specifically 80 to 100° C., but is not limited thereto. In addition, the extraction time may be 10 minutes to 72 hours, specifically 20 minutes to 48 hours, but may be more specifically 1 to 5 hours, but is not limited thereto. Furthermore, the extraction frequency is preferably 1 to 5 times, but is not limited thereto.

Further, after Step 2), the following steps may be additionally included:

3) concentrating the filtrate of Step 2) under reduced pressure; and
4) drying the concentrate of Step 3).

In the present invention, the reduced pressure concentration of Step 3) may be preferably accomplished using a vacuum reduced pressure concentrator or a vacuum rotary evaporator, but is not limited thereto. In addition, the drying is preferably reduced pressure drying, vacuum drying, boiling drying, spray drying, or freeze drying, but is not limited thereto.

In the present invention, the enzyme-treated Ashwagandha extract may be prepared by treating an Ashwagandha extract with an enzyme by a method including the following steps, but is not limited thereto.

a) adding purified water to the Ashwagandha extract prepared through Steps 1) and 2), adjusting the pH, and then treating and reacting the Ashwagandha extract with an enzyme; and
b) inactivating the enzyme by heating the Ashwagandha extract of Step a).

In Step a), it is possible to add purified water in an amount which is 5-fold to 15-fold, 7-fold to 13-fold, or 9-fold to 11-fold the amount of Ashwagandha extract, but the fraction is not limited thereto. The pH may be adjusted to 5.0 to 6.0. When the pH is out of the above range, the reaction activity of the enzyme may deteriorate.

Furthermore, the Ashwagandha extract may be treated with the enzyme in an amount of 0.5 to 4 parts by weight, 1 to 3 parts by weight or 1.5 to 2.5 parts by weight with respect to 100 parts by weight of the Ashwagandha extract, the reaction may be performed at 50 to 70° C. for 10 to 14 hours, but the present invention is not limited thereto.

In this case, the enzyme may be an amylolytic enzyme, and the amylolytic enzyme may be an amylase and specifically α-amylase and/or β-amylase. Further, the α-amylase and β-amylase may be included at a weight ratio of 1:10 to 10:1, 1:9 to 9:1, 1:8 to 8:1, 1:7 to 7:1, 1:6 to 6:1, 1:5 to 5:1, 1:4 to 4:1, 1:3 to 3:1 or 1:2 to 2:1, but the weight ratio is not limited thereto.

The enzyme-treated Ashwagandha extract in Step b) may be inactivated by heating at 90 to 110° C. for 10 to 20 minutes, but is not limited thereto.

In the present invention, the composition may prevent or treat sleep disorders or insomnia by decreasing sleep latency and awake time during sleep and increasing sleep time, non-rapid eye movement (NREM) sleep time and δ-waves.

In a specific exemplary embodiment of the present invention, the present inventors prepared an Ashwagandha extract and an Ashwagandha extract treated with an amylolytic enzyme as an enzyme.

In addition, the present inventors confirmed that when the Ashwagandha extract was administered to animal models, the sleep improvement effect is insignificant, whereas when an enzyme-treated Ashwagandha extract was administered, the quality of sleep was improved by decreasing the sleep latency and awake time during sleep in a concentration-dependent manner and increasing sleep time, NREM sleep time and δ-waves. Furthermore, it was confirmed that an enzyme-treated Ashwagandha extract improved not only the amount of sleep but also the quality of sleep even in caffeine-induced sleep disorder animal models.

Therefore, since the present inventors confirmed that in a sleep disorder animal model, which was administered an enzyme-treated Ashwagandha extract, sleep latency and awake time during sleep were decreased, sleep time, NREM sleep time and δ-waves were increased, and as a result, sleep activity was improved, the enzyme-treated Ashwagandha extract may be used as an active ingredient of a composition for preventing or treating sleep disorders or insomnia.

The pharmaceutical composition according to the present invention may further include suitable carriers, excipients, and diluents, which are typically used to prepare a pharmaceutical composition.

The pharmaceutical composition according to the present invention may be administered orally or parenterally, and it is desirable to select an injection method for external skin application or intraperitoneal injection, intrarectal injection, subcutaneous injection, intravenous injection, intramuscular injection or intrathoracic injection upon parenteral administration, but the injection method is not limited thereto.

The pharmaceutical composition according to the present invention may be used by being formulated in the form of an oral formulation, such as a powder, a granule, a pill, a capsule, a suspension, an emulsion, a syrup, and an aerosol, an external preparation, a suppository, and a sterile injection solution, according to a typical method. Examples of a carrier, an excipient or a diluent which may be included in the composition include lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinyl pyrrolidone, water, methyl hydroxybenzoate, propyl hydroxybenzoate, talc, magnesium stearate, and mineral oil. When the pharmaceutical composition is prepared, the pharmaceutical composition is prepared using a diluent or excipient, such as a filler, an extender, a binder, a wetting agent, a disintegrant, and a surfactant, which are commonly used. A solid formulation for oral administration includes a tablet, a pill, a powder, a granule, a capsule, and the like, and the solid formulation is prepared by mixing at least one excipient, for example, starch, calcium carbonate, sucrose or lactose, gelatin, and the like. Furthermore, in addition to a simple excipient, lubricants such as magnesium stearate and talc are also used. A liquid preparation for oral administration corresponds to a suspension, a liquid for internal use, an emulsion, a syrup, and the like, and the liquid formulation may include, in addition to water and liquid paraffin which are simple commonly used diluents, various excipients, for example, a wetting agent, a sweetener, an aromatic, a preservative, and the like. Examples of a preparation for parenteral administration include an aqueous sterile solution, a non-aqueous solvent, a suspension, an emulsion, a freeze-dried preparation, and a suppository. As the non-aqueous solvent and the suspension solvent, it is possible to use propylene glycol, polyethylene glycol, a vegetable oil such as olive oil, an injectable ester such as ethyl oleate, and the like. As a base of the suppository, it is possible to use Witepsol, Macrogol, Tween 61, cacao butter, laurin fat, glycerogelatin, and the like. Further, other typical additives such as an antioxidant, a buffer, and a bacteriostatic agent may be added, if necessary.

A preferred dosage of the pharmaceutical composition according to the present invention varies depending on the absorption of the active ingredient in the body and the age, sex and degree of obesity of the patient, but may be appropriately selected by a person skilled in the art. However, for the preferred effect, in the case of an orally administered formulation, the composition of the present invention is generally administered to an adult at 0.0001 to 100 mg/kg, preferably 0.001 to 100 mg/kg, per kg of body weight per day. The administration may be carried out once daily, or may be divided into several times. The dosage is not intended to limit the scope of the present invention in any way.

In addition, the present invention provides a health food composition for preventing or alleviating sleep disorders or insomnia, containing an enzyme-treated Ashwagandha extract as an active ingredient.

In the present invention, since the enzyme-treated Ashwagandha extract and the method for preparing the same are the same as those described above, the specific description references the above content, and only the specific constitution of the health food composition will be described below.

Meanwhile, since the present inventors confirmed that in a sleep disorder animal model, which was administered an enzyme-treated Ashwagandha extract, sleep latency and awake time during sleep were decreased, sleep time, NREM sleep time and δ-waves were increased, and as a result, sleep activity was improved, the enzyme-treated Ashwagandha extract may be used as an active ingredient of a health food composition for preventing or treating sleep disorders or insomnia.

The health food of the present invention is a food prepared by adding an enzyme-treated Ashwagandha extract to food materials such as beverages, teas, spices, gums, and confectioneries, or by encapsulating, powdering, or suspending the enzyme-treated Ashwagandha extract, means that a specific effect in terms of health is brought about when the health food is ingested, but has an advantage in that there is no side effect which may occur when a drug is taken for a long period of time by employing food as a raw material, unlike general drugs. The health food of the present invention thus obtained is very useful because it can be ingested on a daily basis. The amount of enzyme-treated Ashwagandha extract added to such health foods varies depending on the type of health functional food which is a target, and thus, cannot be uniformly specified, but the enzyme-treated Ashwagandha extract may be added within a range that does not impair the original taste of the food, and the amount is typically 0.01 to 50 wt %, preferably 0.1 to 20 wt %, of the target food. Furthermore, in the case of a health functional food in the form of a pill, a granule, a tablet or a capsule, it may be added in a range of typically 0.1 to 100 wt %, preferably 0.5 to 80 wt %.

Further, the present invention provides a food composition for preventing or alleviating sleep disorders or insomnia, containing an enzyme-treated Ashwagandha extract as an active ingredient.

In the present invention, since the enzyme-treated Ashwagandha extract and the method for preparing the same are the same as those described above, the specific description references the above content, and only the specific constitution of the health food composition will be described below.

Meanwhile, since the present inventors confirmed that in a sleep disorder animal model, which were administered an enzyme-treated Ashwagandha extract, sleep latency and awake time during sleep were decreased, sleep time, NREM sleep time and δ-waves were increased, and as a result, sleep activity was improved, the enzyme-treated Ashwagandha extract may be used as an active ingredient of a food composition for preventing or treating sleep disorders or insomnia.

The food composition according to the present invention may be formulated in the same manner as the pharmaceutical composition, and thus used as a functional food or added to various foods. Examples of foods to which the composition of the present invention may be added include beverages, alcoholic beverages, confectioneries, diet bars, dairy products, meats, chocolate, pizza, ramen, other noodles, gums, ice creams, vitamin complexes, health supplement foods, and the like.

The food composition of the present invention may include not only the enzyme-treated Ashwagandha extract as an active ingredient, but also ingredients that are typically added during food preparation, and includes, for example, a protein, carbohydrate, fat, nutrient, seasoning and a flavoring agent. Examples of the above-described carbohydrate include typical sugars such as monosaccharides, for example, glucose, fructose and the like; disaccharides, for example, maltose, sucrose and the like; and polysaccharides, for example, dextrin, cyclodextrin and the like, and sugar alcohols such as xylitol, sorbitol, and erythritol. As the flavoring agent, it is possible to use a natural flavoring agent [thaumatin, *stevia* extract (for example, rebaudioside A, glycyrrhizin and the like]) and/or a synthetic flavoring agent (saccharin, aspartame, and the like). For example, when the food composition of the present invention is prepared as a drink and a beverage, the composition may additionally include citric acid, liquid fructose, sugar, sucrose, acetic acid, malic acid, a fruit juice, various vegetable extracts, and the like in addition to the enzyme-treated Ashwagandha extract of the present invention.

Hereinafter, the present invention will be described in detail through Examples.

However, the following Examples are only for exemplifying the present invention, and the content of the present invention is not limited by the following Examples.

<Preparation Example 1> Preparation of Ashwagandha Extract

Ashwagandha (scientific name: Withania somnifera) roots were washed with purified water, dried and pulverized. Thereafter, the pulverized Ashwagandha roots were added to a 4-fold volume of purified water, and extraction was performed at 90° C. for 3 hours. The extracted extract was filtered using a 100 mesh filter, and then concentrated to a total solid content of 10 to 25% under a reduced pressure of 500 mmHg using a vacuum reduced pressure concentrator. A 10% volume of an excipient, dextrin, was added to the concentrate, followed by spray drying and pulverization to obtain an extract powder.

<Preparation Example 2> Preparation of Enzyme-Treated Ashwagandha Extract

Ashwagandha roots were washed with purified water, dried and pulverized. Thereafter, the pulverized Ashwagandha roots were added to a 4-fold volume of purified water, and extraction was performed at 90° C. for 3 hours. The extracted extract was filtered using a 100 mesh filter, and then concentrated to a total solid content of 10 to 25% under a reduced pressure of 500 mmHg using a vacuum reduced pressure concentrator. The pH of the concentrate was adjusted to 5.5 using a 1 NaOH solution for enzyme treatment. Then, after α-amylase (Spezyme LT 300) and β-amylase (Betalase 1500 EL), which are amylolytic enzymes, as enzymes, were each added thereto at 1% of the concentrate, the resulting mixture was reacted at 60° C. for 12 hours. After the reaction, the enzymes were inactivated at 100° C. for 15 minutes, and a 10% volume of an excipient, dextrin, was added thereto, followed by spray drying to obtain an enzyme-treated Ashwagandha extract powder.

<Experimental Example 1> Sleep Activity Evaluation of Ashwagandha Extract Using Animal Model <1-1> Pentobarbital-Induced Sleep Test To examine the sleep activity of an Ashwagandha extract at each concentration in an animal model, a pentobarbital-induced sleep test was performed.

Specifically, 7-week-old male ICR mice were fed solid feed and water ad libitum, adapted for 1 week while maintaining an environment with a temperature of 20 to 22° C., a humidity of 50 to 55%, and a 12-hour light-dark cycle, and then used in experiments. The mice were divided into 6 mice per group, and all the mice were fasted for 24 hours prior to the experiment. In addition, the Ashwagandha extract (25, 50, 60, 80, 100, 150, 200, and 300 mg/kg) prepared in <Preparation Example 1> was dissolved in 0.9% physiological saline. The Ashwagandha extract was orally administered (p.o.) 45 minutes before the administration of pentobarbital within a certain period of time between 1:00 pm and 6:00 pm on the day of the experiment. Pentobarbital was intraperitoneally injected (i.p.) at 42 mg/kg (sleep-inducing threshold concentration). After pentobarbital injection, the mice were transferred to a separate space to sleep, and then sleep latency was recorded. In addition, a sleep duration was set to the time from loss of a static reflex to recovery and recorded. Normal mice (NOR) were used as a control. Furthermore, the Ashwagandha extract administration group was divided into low-concentration administration groups (25, 50, 100 and 150 mg/kg administration groups) and high-concentration administration groups (60, 80, 100, 200, and 300 mg/kg administration groups), and the two concentration administration groups were compared.

As shown in Table 1 and FIG. 1, as a result of comparison among the Ashwagandha extract low-concentration administration groups, the sleep latency was slightly decreased in the 50 mg/kg Ashwagandha extract administration group (A50 group) compared to the normal control (NOR group), and the sleep latency was increased in the other Ashwagandha extract administration groups (A25, A100 and A150 groups). In addition, the sleep duration was increased in the A50 group, but there was no significance, and the sleep duration was decreased in the other Ashwagandha extract administration groups (A25, A100 and A150 groups).

TABLE 1

| Group | Sleep latency (min) | Sleep duration (min) |
|---|---|---|
| NOR | 3.70 ± 0.30 | 40.0 ± 4.10 |
| A25 | 5.15 ± 0.16** | 32.74 ± 2.88 |
| A50 | 3.48 ± 0.58 | 44.75 ± 4.02 |
| A100 | 4.38 ± 0.10 | 23.96 ± 4.48* |
| A150 | 3.96 ± 0.27 | 30.03 ± 4.04 |

Figure 2:
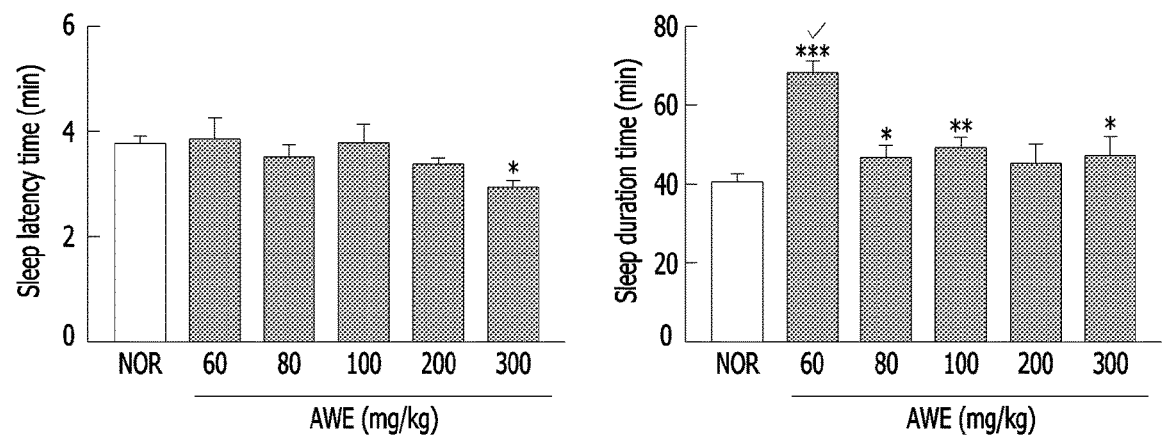
FIG. 2 is a view confirming changes in sleep latency and sleep duration by administration of 60, 80, 100, 200 or 300 mg/kg of the Ashwagandha extract prepared in an exemplary embodiment of the present invention in animal models ($*p<0.05$, $p<0.01$, $*p<0.001$)

Furthermore, as shown in Table 2 and FIG. 2, as a result of comparison among the Ashwagandha extract high-concentration administration groups, the sleep latency was increased in the 60 mg/kg Ashwagandha extract administration group (AWE60) compared to the NOR group, and the sleep latency was decreased in the other Ashwagandha extract administration groups (AWE80, AWE100, AWE200 and AWE300 groups), but there was no significance except for the AWE300 group. Further, the sleep duration was increased in all the Ashwagandha extract high-concentration administration groups, but there was no significance in the AWE200 group.

TABLE 2

| Group | Sleep latency (min) | Sleep duration (min) |
|---|---|---|
| NOR | 3.70 ± 0.23 | 40.00 ± 1.90 |
| AWE60 | 3.76 ± 0.59 | 64.76 ± 3.47*** |
| AWE80 | 3.38 ± 0.26 | 48.13 ± 2.88* |
| AWE100 | 3.64 ± 0.42 | 50.30 ± 2.09** |
| AWE200 | 3.23 ± 0.16 | 44.89 ± 5.47 |
| AWE300 | 2.93 ± 0.13* | 48.66 ± 3.37* |

Through the above results, it can be seen that the Ashwagandha extract has an insignificant effect of improving sleep activity.

<Experimental Example 2> Sleep Activity Evaluation of Enzyme-Treated Ashwagandha Extract Using Animal Model <2-1> Pentobarbital-Induced Sleep Test To examine the sleep activity of an enzyme-treated Ashwagandha extract in an animal model, a pentobarbital-induced sleep test was performed.

Specifically, the enzyme-treated Ashwagandha extract (25, 50, 60, 80, 100, and 150 mg/kg) prepared in <Preparation Example 2> was dissolved in 0.9% physiological saline. Thereafter, the enzyme-treated Ashwagandha extract was orally administered in the same manner as described in the method described in Experimental Example <1-1>, and a pentobarbital-induced sleep test was performed. In this case, 60 mg/kg of the Ashwagandha extract was orally administered to the comparative group. Further, normal mice were used as a control.

Figure 3:
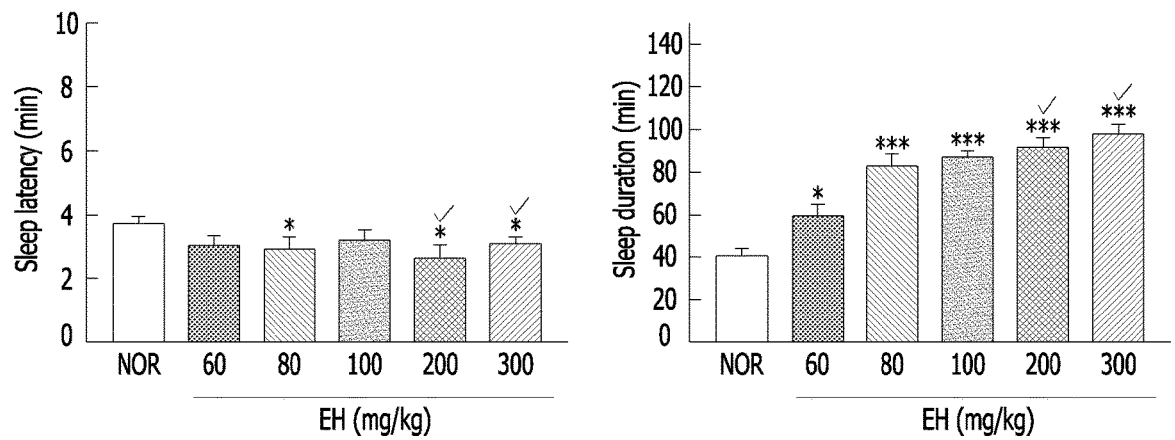
FIG. 3 is a view confirming changes in sleep latency and sleep duration by administration of 60 mg/kg of the Ashwagandha extract prepared in an exemplary embodiment of the present invention or 60, 80, 100 or 150 mg/kg of the enzyme-treated Ashwagandha extract prepared in an exemplary embodiment of the present invention in animal models (*p<0.05, ***p<0.001)

As a result, as shown in Table 3 and FIG. 3, compared to the normal control (NOR group), sleep latency was decreased in all the enzyme-treated Ashwagandha extract administration groups (EH60, EH80, EH100, and EH150 groups), and significantly decreased particularly in the EH60, EH100, and EH150 groups. In addition, the sleep duration was significantly increased in a concentration-dependent manner in all the enzyme-treated Ashwagandha extract administration groups (EH60, EH80, EH100, and EH150 groups) compared to the NOR group. Furthermore, the EH60 group exhibited a shorter latency and a significantly longer sleep duration than the group administered the same concentration of the Ashwagandha extract (A60 group).

TABLE 3

| Group | Sleep latency (min) | Sleep duration (min) |
|---|---|---|
| NOR | 3.70 ± 0.28 | 40.00 ± 5.96 |
| A60 | 3.19 ± 0.20 | 59.83 ± 5.75* |
| EH60 | 3.03 ± 0.15* | 79.76 ± 6.28*** |
| EH80 | 3.28 ± 0.19 | 82.58 ± 1.50*** |

TABLE 3-continued

| Group | Sleep latency (min) | Sleep duration (min) |
|---|---|---|
| EH100 | 2.87 ± 0.16* | 88.98 ± 2.59*** |
| EH150 | 3.00 ± 0.15* | 93.39 ± 3.01** |

<2-2> EEG Measurement

To examine the sleep activity of an enzyme-treated Ashwagandha extract in an animal model, an EEG was measured.

Specifically, 7-week-old male SD rats were fed solid feed and water ad libitum, adapted for 1 week while maintaining an environment with a temperature of 20 to 22° C., a humidity of 50 to 55%, and a 12-hour light-dark cycle, and then used in experiments. Further, the enzyme-treated Ashwagandha extract (80 and 100 mg/kg) prepared in <Preparation Example 2> was dissolved in 0.9% physiological saline. Rats were anesthetized by inhalation of isoflurane for surgery and fixed in a stereotaxic device to insert EEG electrodes according to the Paxinos and Watson atlas. After surgery, rats were divided into 4 animals per group, and attached to EEG transmitters after a recovery period of 1 week. Thereafter, the enzyme-treated Ashwagandha extract was orally administered. 80 mg/kg of the Ashwagandha extract was orally administered to the comparative group. Further, normal mice were used as a control. An EEG was measured at 15 mm/sec from 10:00 am to 6:00 pm for 9 days based on the time point of oral administration. EEG activity data was collected using Iox2 data collection software (version 2.8.0.13, emka Technologies) and EEG spectra were analyzed at a frequency of 1 Hz. The standard band settings are as follows: δ wave 0.5 to 4 Hz; θ wave, 4 to 9 Hz; α wave, 9 to 12 Hz; β wave, 12 to 30 Hz; and γ wave, 30 to 60 Hz. Awake time, total sleep time and sleep (REM, non-REM) time, δ waves, and θ waves were confirmed through EEG analysis.

Figure 4:
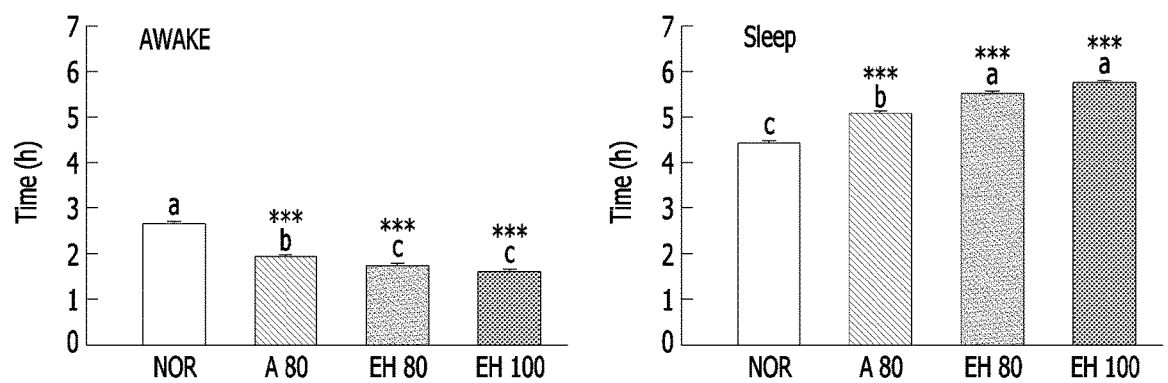
FIG. 4 is a view confirming changes in awake time and total sleep time by administration of 80 mg/kg of the Ashwagandha extract prepared in an exemplary embodiment of the present invention or 60, 80, 100 or 150 mg/kg of the enzyme-treated Ashwagandha extract prepared in an exemplary embodiment of the present invention in animal models (***p<0.001)

As a result, as shown in Table 4 and FIG. 4, the enzyme-treated Ashwagandha extract administration groups (EH80 and EH100 groups) exhibited a significantly short awake time and a long total sleep time compared to the normal control (NOR group). In addition, the EH80 group exhibited a significantly shorter awake time and a longer total sleep duration than the group administered the same concentration of the Ashwagandha extract (A80 group).

TABLE 4

| Group | Awake time (h) | Sleep time (h) |
|---|---|---|
| NOR | 2.65 ± 0.05 | 4.31 ± 0.01 |
| A80 | 1.88 ± 0.04*** | 5.09 ± 0.05*** |
| EH80 | 1.68 ± 0.03*** | 5.33 ± 0.03*** |
| EH100 | 1.60 ± 0.07*** | 5.40 ± 0.07*** |

Figure 5:
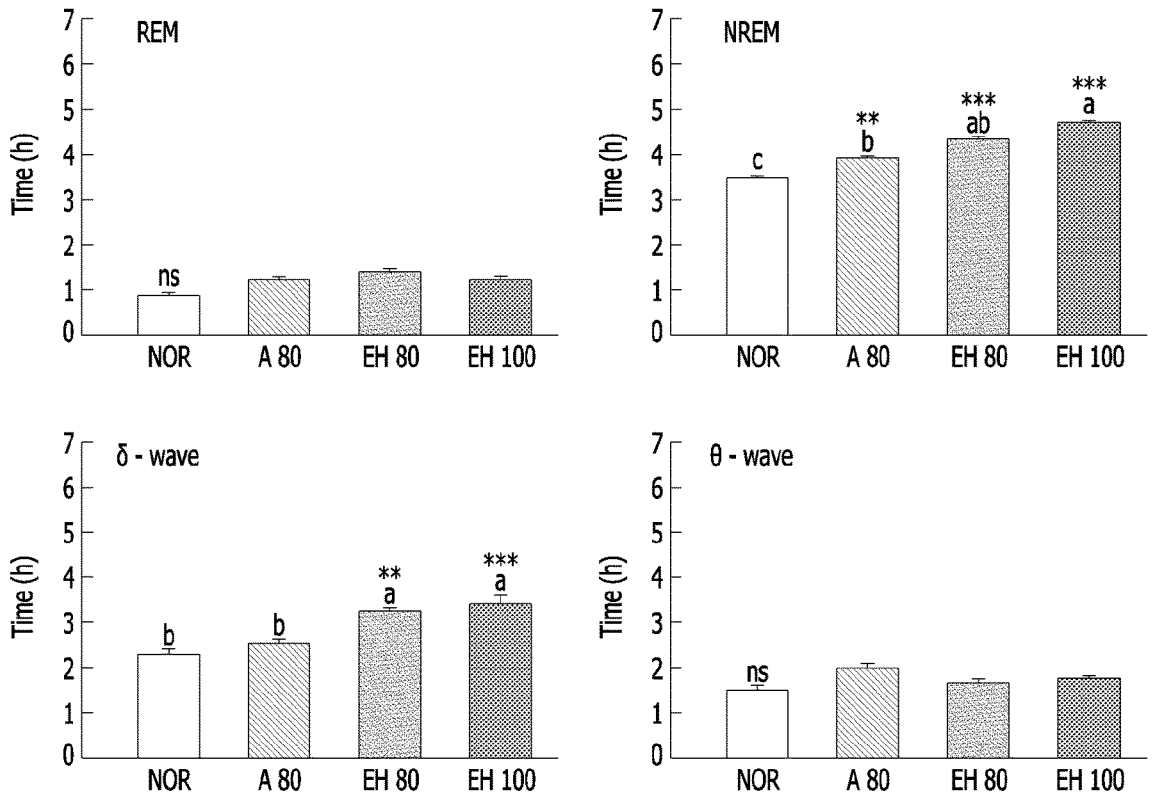
FIG. 5 is a view confirming changes in REM sleep time, NREM sleep time, δ-waves and θ-waves by administration of 80 mg/kg of the dextrin-added Ashwagandha extract prepared in an exemplary embodiment of the present invention, or 80 or 100 mg/kg of the enzyme-treated Ashwagandha extract prepared in an exemplary embodiment of the present invention in animal models (p<0.01, *p<0.001)

In addition, as shown in Tables 5 and 6 and FIG. 5, the NREM sleep time was increased in a dose-dependent manner and the & waves involved in deep sleep were significantly increased in the enzyme-treated Ashwagandha extract administration groups (EH80 and EH100 groups), compared to the NOR group. Furthermore, NREM sleep time and & waves were significantly increased in the EH80 group compared to the group administered the same concentration of dextrin-added extract (A80 group).

TABLE 5

| Group | Duration of REM (h) | Duration of NREM (h) |
|---|---|---|
| NOR | 0.90 ± 0.07$^{ns}$ | 3.40 ± 0.06 |
| A80 | 1.16 ± 0.05 | 3.92 ± 0.03** |
| EH80 | 1.17 ± 0.10 | 4.15 ± 0.08*** |
| EH100 | 1.01 ± 0.07 | 4.39 ± 0.11*** |

TABLE 6

| Group | δ wave of NREM (h) | θ wave of NREM (h) |
|---|---|---|
| NOR | 2.09 ± 0.14 | 1.31 ± 0.14$^{ns}$ |
| A80 | 2.18 ± 0.14 | 1.75 ± 0.13 |
| EH80 | 2.81 ± 0.04** | 1.34 ± 0.11 |
| EH100 | 2.96 ± 0.11*** | 1.43 ± .03 |

Through the above results, it can be seen that the enzyme-treated Ashwagandha extract improves the deteriorated sleep activity by improving not only the amount of sleep but also the quality of sleep in a concentration-dependent manner.

<Experimental Example 3> Sleep Activity Evaluation of Enzyme-Treated Ashwagandha Extract Using Sleep Disorder Animal Model <3-1> EEG Measurement To examine the sleep activity of enzyme-treated Ashwagandha extract in a caffeine-induced sleep disorder animal model, an EEG was measured.

Specifically, 7-week-old male SD rats were fed solid feed and water ad libitum, adapted for 1 week while maintaining an environment with a temperature of 20 to 22° C., a humidity of 50 to 55%, and a 12-hour light-dark cycle, and then used in experiments. Further, the enzyme-treated Ashwagandha extract prepared in <Preparation Example 2> was dissolved in 0.9% physiological saline. Rats were anesthetized by inhalation of isoflurane for surgery and fixed in a stereotaxic device to insert EEG electrodes according to the Paxinos and Watson atlas. After surgery, rats were divided into 6 animals per group, and attached to EEG transmitters after a recovery period of 1 week. Thereafter, 40 mg/kg of caffeine was orally administered together with the enzyme-treated Ashwagandha extract. 0.2 mg/kg benzodiazepine was orally administered to a positive control, and only caffeine was administered to a negative control. In addition, normal mice were used as a normal group. An EEG was measured and EEG activity data was confirmed from 10:00 am to 6:00 pm based on the time point of oral administration in the same manner as the method described in Experimental Example <2-2>.

Figure 6:
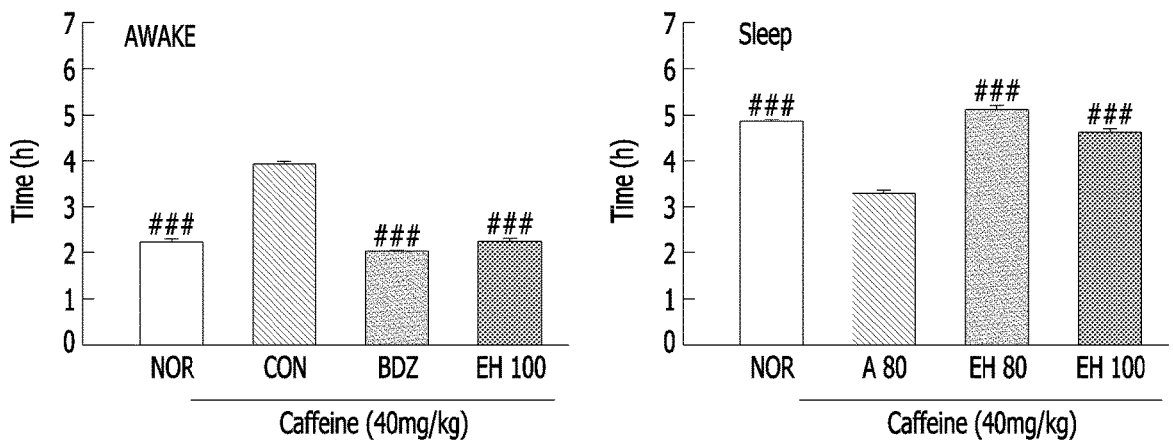
FIG. 6 is a view confirming changes in awake time and total sleep time by administration of 100 mg/kg of the enzyme-treated Ashwagandha extract prepared in an exemplary embodiment of the present invention in caffeine-induced sleep disorder animal models (##p<0.01, ###p<0.001)

As a result, as shown in Table 7 and FIG. 6, it was confirmed that the negative control group (CON group) showed a significantly longer awake time and a significantly shorter sleep time than the normal group (NOR group), and thus, a sleep disorder animal model was effectively constructed by administration of caffeine. Conversely, the awake time was significantly decreased and the sleep time was significantly increased in the enzyme-treated Ashwagandha extract administration group (EH100 group) compared to the CON group.

TABLE 7

| Group | Caffeine (40 mg/kg) | Awake time (h) | Sleep time (h) |
|---|---|---|---|
| NOR | − | 2.10 ± 0.04$^{\#\#\#}$ | 4.90 ± 0.04$^{\#\#\#}$ |
| CON | + | 3.98 ± 0.03 | 3.03 ± 0.09 |
| BDZ | + | 1.85 ± 0.01$^{\#\#\#}$ | 5.15 ± 0.07$^{\#\#\#}$ |
| EH100 | + | 2.13 ± 0.02$^{\#\#\#}$ | 4.64 ± 0.10$^{\#\#\#}$ |

Figure 7:
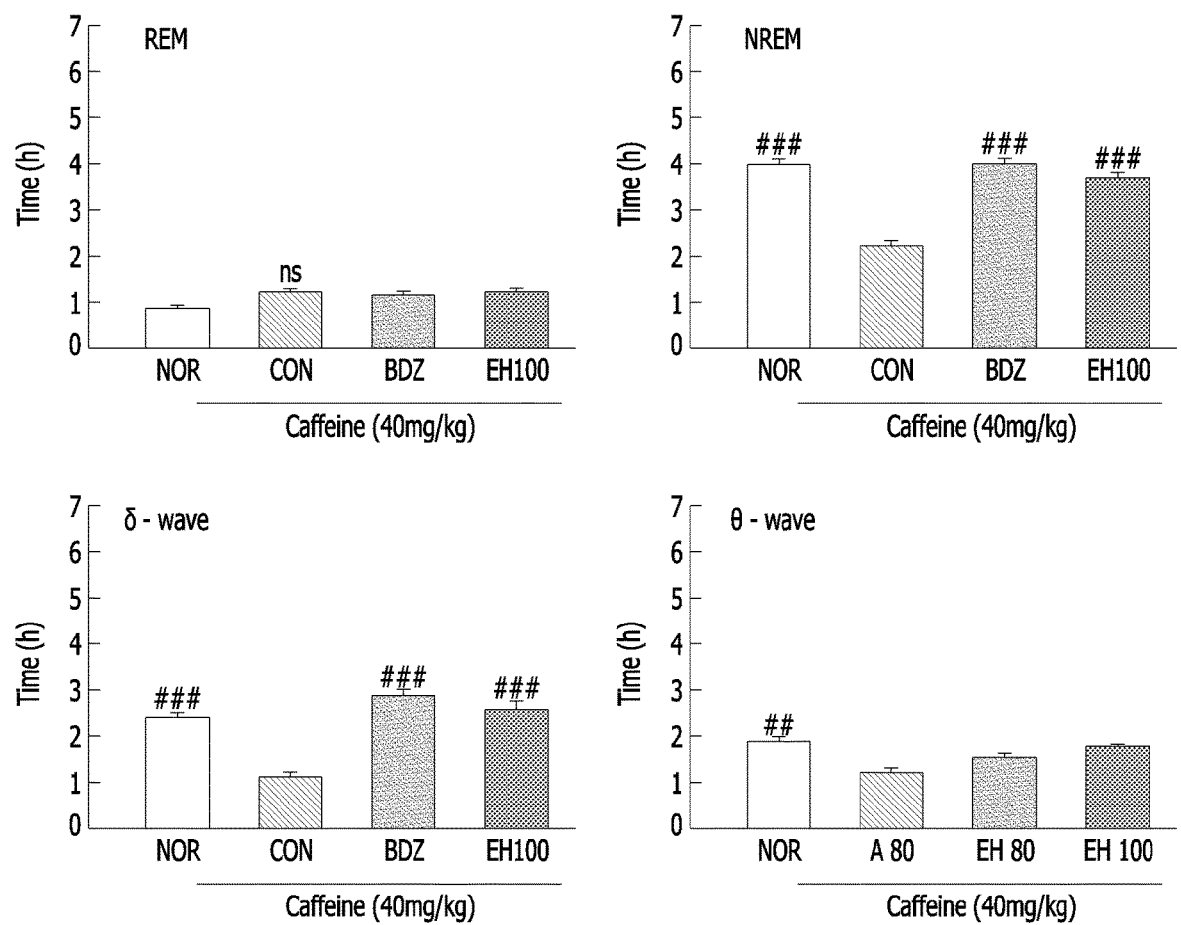
FIG. 7 is a view confirming changes in REM sleep time, NREM sleep time, δ-waves and θ-waves by administration of 100 mg/kg of the enzyme-treated Ashwagandha extract prepared in an exemplary embodiment of the present invention in caffeine-induced sleep disorder animal models (##p<0.01, ###p<0.001).

In addition, as shown in Tables 8 and 9 and FIG. 7, it was confirmed that in the case of the CON group, the NREM sleep time and the δ and θ wave time were significantly decreased compared to the NOR group, and thus a sleep disorder animal model was effectively constructed by administration of caffeine. Conversely, the NREM sleep time was significantly increased and the δ waves involved in deeper sleep were also significantly increased in the EH100 group compared to the CON group.

TABLE 8

| Group | Caffeine (40 mg/kg) | δ wave of NREM (h) | θ wave of NREM (h) |
|---|---|---|---|
| NOR | − | 0.74 ± 0.13 | 4.16 ± 0.18$^{\#\#\#}$ |
| CON | + | 1.07 ± 0.10$^{ns}$ | 1.95 ± 0.14 |
| BDZ | + | 0.98 ± 0.11 | 4.16 ± 0.08$^{\#\#\#}$ |
| EH100 | + | 1.03 ± 0.15 | 3.61 ± 0.13$^{\#\#\#}$ |

TABLE 9

| Group | Caffeine (40 mg/kg) | δ wave of NREM (h) | θ wave of NREM (h) |
|---|---|---|---|
| NOR | − | 2.33 ± 0.13$^{\#\#\#}$ | 1.83 ± 0.25$^{\#\#}$ |
| CON | + | 1.05 ± 0.08 | 0.89 ± 0.08 |
| BDZ | + | 2.92 ± 0.16$^{\#\#\#}$ | 1.24 ± 0.09 |
| EH 100 | + | 2.37 ± 0.06$^{\#\#\#}$ | 1.47 ± 0.10 |

Through the above results, it can be seen that the Ashwagandha extract treated with enzyme in the same manner as in the results of <Experimental Example 2> shows a sleep-promoting activity effect due to an increase in the δ waves and NREM sleep, thereby improving sleep disorders.

Since it was confirmed in the present invention that in an animal model and a sleep disorder animal model, which were administered an enzyme-treated Ashwagandha extract, sleep latency and awake time during sleep were decreased, sleep time, non-rapid eye movement (NREM) sleep time and δ-waves were increased, and as a result, sleep activity was improved, the enzyme-treated Ashwagandha extract can be used as an active ingredient of a composition for preventing or treating sleep disorders or insomnia.

What is claimed is:

1. A method for producing an Ashwagandha compound, the method comprising the following steps:
    a) adding purified water to an Ashwagandha water extract, adjusting the pH to between 5.0 to 6.0, and then treating and reacting the Ashwagandha water extract with α-amylase and β-amylase at a temperature of 50° C. to 70° C. for 10 to 14 hours, wherein the α-amylase and β-amylase are present in a combined amount of 0.5 to 4 parts by weight per 100 parts by weight of the Ashwagandha extract;
    b) inactivating the enzymes by heating the Ashwagandha water extract of Step a) at 90° C. to 110° C. for 10 to 20 minutes;

c) filtering the enzyme-inactivated extract to remove precipitates; and
d) drying the filtered extract to obtain the Ashwagandha compound.

2. The method of claim 1, wherein the purified water is added in an amount of 5-fold to 15-fold by weight relative to the Ashwagandha extract.

3. The method of claim 1, wherein the extract is filtered using a 100 mesh filter before drying.

4. The method of claim 1, wherein the filtered extract is spray-dried to obtain the enzyme-treated Ashwagandha compound.

5. The method of claim 1, wherein the Ashwagandha compound contains a total solid content of 10% to 25% before drying.

* * * * *